United States Patent [19]

Koreicho

[11] 4,211,485
[45] Jul. 8, 1980

[54] DEVICE FOR SUPPRESSING VERY CLOSE INTERFERENCE ECHO SIGNALS IN OPTICAL PULSE COMPRESSION RADARS

[75] Inventor: Wladimir Koreicho, Chilly Mazarin, France

[73] Assignee: Societe Anonyme de Telecommunications, Paris, France

[21] Appl. No.: 914,412

[22] Filed: Jun. 12, 1978

[30] Foreign Application Priority Data

Jun. 16, 1977 [FR] France .............................. 77 18556

[51] Int. Cl.² .......................... G01C 3/08; G01S 7/28
[52] U.S. Cl. ................................... 356/5; 343/17.2 PC
[58] Field of Search ............. 356/5, 17.2 R, 17.2 PC, 356/17.5

[56] References Cited

U.S. PATENT DOCUMENTS

| | | | |
|---|---|---|---|
| 3,493,969 | 2/1970 | Bonnaval et al. | 343/17.2 PC |
| 3,647,298 | 3/1972 | Soules | 356/5 |
| 3,825,340 | 7/1974 | Debart | 356/5 |
| 3,841,755 | 10/1974 | Debart | 356/5 |
| 3,875,571 | 4/1975 | Davis, Jr. et al. | 343/17.2 PC |
| 4,003,053 | 1/1977 | Mengel | 343/17.2 R |

Primary Examiner—S. C. Buczinski
Attorney, Agent, or Firm—Jacobs & Jacobs

[57] ABSTRACT

A device for suppressing the interference echo signals in an optical pulse compression radar comprising, at the transmitting side, a circuit for generating electrical signals of determined duration and with a frequency variable as a function of time, called chirps, an optical transmitter comprising a continuous transmission source modulated by the chirps and, at the receiving side, a receiver for deriving chirps from the light signals received and a processing circuit for the chirps supplied by the receiver, comprising a first mixer receiving from said receiver the reception chirp and from said circuit the transmission chirp and then, when the latter is ended, a relay signal of a determined frequency, said first mixer delivering a signal of a frequency equal to the difference of the frequencies of the input signals, a filter for filtering out the interference component of the output signal from the first mixer, and a second mixer receiving, on the one hand, the signal thus filtered and, on the other hand, the transmission chirp and then said relay signal, and delivering to said processing circuit a signal of a frequency equal to the difference of the frequencies of the input signals.

3 Claims, 3 Drawing Figures

DEVICE FOR SUPPRESSING VERY CLOSE INTERFERENCE ECHO SIGNALS IN OPTICAL PULSE COMPRESSION RADARS

Pulse compression radars are known. In such apparatuses, the continuous electromagnetic radiation transmitted by a source is modulated by an electrical signal of determined duration and the frequency of which is a linear function of time. Such a signal, hereafter called chirp, is produced in known manner by applying a pulse to a dispersive delay line. Such a system has an advantage in that it does not require a very high peak power.

The application of such a method in optical radars, comes up against reflection phenomena in the optics of the apparatus and to retro-diffusion effects in the atmosphere which produce echo signals which are received simultaneously to the transmission, as the distance between the "objects" which may be considered as the source of such echo signals and the apparatus can be held to be nil.

The interference chirps generated by such echo signals have a far higher level than that of the useful chirps corresponding to remote objects which it is desired to detect, for instance $10^{10}$ times higher. On the other hand, since each signal transmitted by the hereabove apparatus has a relatively long duration, the transmission period of a signal is likely to overlap to a large extent with the reception period of the reflected signal. Consequently, the reception period of the useful chirp will overlap to a large extent with that of the interference chirp, which making very difficult if not impossible the detection of the useful chrip.

The object of the invention is therefore a device for suppressing such interference echo signals from the signals received by the apparatus.

In order to reach such an object, the invention makes use of the fact that the interference chirp is substantially coincident in time with the corresponding transmitted chirp, and consequently the frequency of the interference chirp is equal at each moment to the frequency of the transmitted chirp. Since this frequency is substantially different from the frequency of the useful chirp, it is possible to filter out the interference component of the received signal by means of appropriate mixers and filters.

There is provided according to the invention a device for suppressing the interference echo signals in an optical pulse compression radar which comprises, at the transmitting side, a circuit for generating electrical signals of determined duration and with a frequency variable as a function of time, called chirps, and an optical transmitter comprising a continuous transmission source modulated by the chirps, and, at the receiving side, a receiver for deriving chirps from the light signals received and a circuit for processing the chirps provided by the receiver, comprising a first mixer receiving from said receiver the reception chirp and from said circuit the transmission chirp and when the latter is ended, a relay signal of a determined frequency, said first mixer delivering a signal of a frequency equal to the difference of the input signal frequencies, a band stop filter for filtering out the interference component of the output signal from the first mixer, and a second mixer receiving on the one hand the signal thus filtered and, on the other hand, the transmission chirp then said relay signal, and delivering to said processing circuit a signal of a frequency equal to the difference of the input signal frequencies.

The invention will become more apparent from the following description, with reference to the accompanying drawings wherein.

Figure 1:
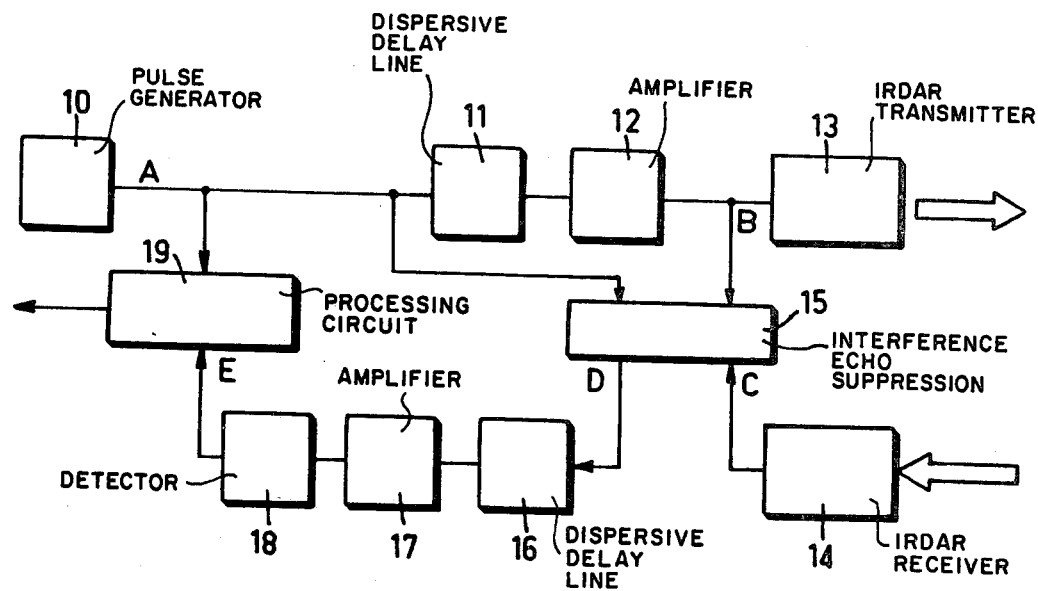
FIG. 1 is a block diagram of an optical radar provided with the device according to the invention for suppressing the interference echo signals.

The apparatus shown schematically in FIG. 1 is an IRDAR (Infra Red Detection And Ranging), that is a radar type apparatus, but using an infrared radiation instead of radioelectrical waves.

Figure 3:
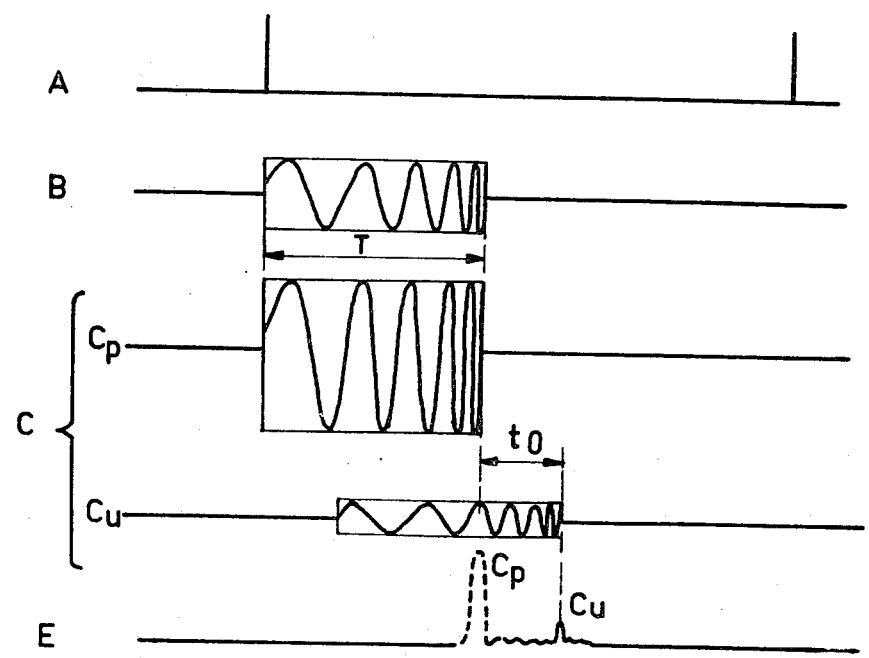
FIG. 3 shows the shape of the signals transmitted and received in the radar of FIG. 1.

The pulse generator 10 delivers at a determined rate Dirac pulses such as those shown at A in FIG. 3. Said pulses are applied to a dispersive delay line 11 connected to an amplifier 12. At the output of amplifier 12 a signal called a chirp is obtained, with a determined duration T and a frequency $F_I$ varying linearly as a function of time between two frequencies $F_1$ and $F_2$, the frequency being given by the expression $$F_I = F_1 + k \cdot t \text{ (with } k = (F_2 - F_1)/T\text{)}$$

if the moment where the pulse is transmitted is chosen as the time origin. This chirp is shown at B in FIG. 3.

The chirp B is applied to an IRDAR transmitter 13, and acts to modulate the continuous infrared radiation transmitted for instance by a continuous transmission laser incorporated in the transmitter.

The IRDAR receiver 14 receives a composite light signal comprising simultaneously a useful signal produced by the reflection of the signal transmitted by transmitter 13 by a remote object to be detected, and an interference signal produced by the retro-diffusion of the light signal transmitted by transmitter 13 in the optics of the apparatus, not shown, and from the reflection of said signal by the atmosphere close to the apparatus.

The receiver 14 derives from the aforementioned composite signal an electrical signal comprising a useful chirp $C_u$ corresponding to the useful light signal and an interference chirp $C_p$ corresponding to the interference signal.

The interference light signal being considered as having travelled along a zero distance, the chirps B and $C_p$ coincide in time, as is shown in FIG. 3. On the contrary, the useful echo signal has travelled twice along the distance between the apparatus and the remote object which has reflected the signal, and is therefore received with a delay $t_o$. The useful chirp $C_u$ is therefore shifted by $t_o$ in relation to chirp $B_o$.

On the other hand, it will be understood that FIG. 3 gives a very deformed representation of the signal levels. In fact, if the level of signal B is chosen equal to unity, the interference chirp $C_p$ has, for instance a level running to 10-4 and the useful chirp $C_u$ a level running to $10^{-14}$, that is $10^{10}$ times lower than that of $C_p$. Taking in account the fact that the duration T of the chirps and the shift $t_o$ are in the same range, it is necessary to suppress component $C_p$ in the output signal from receiver 14, and this is provided in device 15 which will be described hereafter with reference to FIG. 2.

The useful chirp $C_u$ supplied by device 15 is passed thereafter in a dispersive delay line 16, operating reversely of the delay line 11 of the transmission portion, the output signal of which is amplified in an amplifier 17 and applied to a diode detector 18 connected to the processing circuit 19, which derives from signal E (see FIG. 3) supplied by detector 18 the required data. The circuit 19 supplies for instance the distance of the remote object which has reflected the signal, by determining the time shift between the signal E and the pulse A supplied by generator 10.

Figure 2:
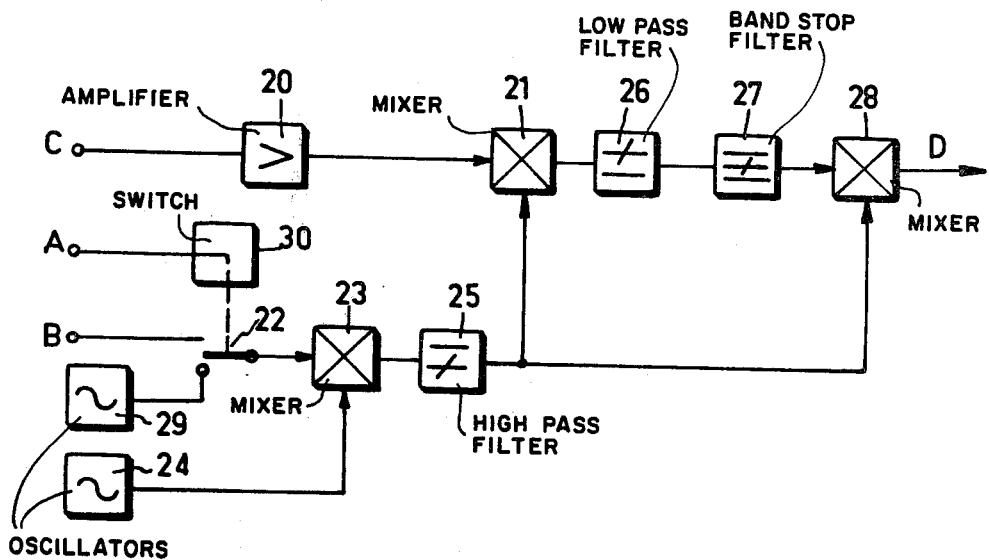
FIG. 2 shows an embodiment of the device according to the invention.

Referring now to FIG. 2, the device 15 suppressing the interference chirp $C_p$ in the output signal C of receiver 14 will now be described.

The device 15 receives at one input the signal C which is amplified in an amplifier 20 and applied to one of the inputs of a mixer 21. The device 15 receives on another input the chirp B applied to transmitter 13.

The chirp B is applied through switch 22, the control of which will be made clear hereafter, to one of the inputs of a mixer 23 which receives at its other input a constant frequency signal $F'_1$ supplied by an oscillator 24. The mixer 23 is associated with a high pass filter 25 in such manner that the output signal from mixer 23 has a frequency equal to the sum of the frequencies of the input signals. Said output signal is applied to the other input of mixer 21. The latter being associated to a low-pass filter 26, the output of said filter is a signal whose frequency is the difference of the frequencies of the input signals.

The frequency of the chirp B is, with the preceding notations:

$$F_l = F_1 + k \cdot t$$

The output signal of filter 25 has therefore a frequency of:

$$F'_l = F'_1 + F_l = F'_1 + F_1 + k \cdot t$$

The interference chirp $C_p$ has the same frequency as chirp B, that is $F_l$, since it has a zero delay in relation thereto.

The mixing of the output signal from filter 25 and the interference chirp $C_p$ in mixer 21 results in an interference component of frequency $$F'_l - F_l = F'_1$$

which will be easily filtered out.

The useful chirp $C_u$ being shifted by a time $t_o$ in relation to chirp B, its frequency is:

$$F_R = F_1 + k \cdot (t - t_o)$$

Its mixing with the output signal from filter 25 gives therefore a beat signal of frequency $$F_b = F'_l - F_R = (F'_1 + F_1 + k \cdot t) - (F_1 + k \cdot (t - t_o)) = F'_1 + k \cdot t_o$$

By passing the output signal from filter 26 in a band stop filter 27 which stops frequency $F'_1$, the interference component is supressed. The component having passed through filter 27 has therefore a frequency:

$$F_b = F'_1 + k \cdot t_o$$

In order to recover the useful chirp $C_u$, there is provided subsequent to filter 27 a second mixer 28 receiving at one input the output signal from filter 25, of a frequency $F'_l$, and at its other input the output signal from filter 27, of a frequency $F_b$.

The output of mixer 28, is theoretically a component of a frequency equal to the difference of the input frequencies and a component of a frequency equal to the sum of the input frequencies.

In the first case, the frequency is $F'_l - F_b$, that is:

$$(F'_1 + F_1 + k \cdot t) - (F'_1 + k \cdot t_o) = F_1 + k(t - t_o).$$

This is the useful term since the reception chirp C is being recovered.

The second term has a frequency $F'_l + F_b$, that is $$(F'_1 + F_1 + k \cdot t) + (F'_1 + k \cdot t_o) = 2F'_1 + F_1 + k(t + t_o).$$

This term has a frequency which will be far greater than that of the useful term if $F'_1$ is chosen high enough. It will therefore be eliminated in the dispersive delay line 16.

The signal applied to the delay line 16 is therefore cleared of its interference component.

A description will now be given of the operation of switch 22. Said switch may connect mixer 23 either to the input terminal B, or to an oscillator 29 transmitting at a frequency $F_o$ equal for instance to the maximum frequency of the transmission chirp, that is at $F_2$. Switch 22 is controlled by a timer 30 triggered by pulse A and of a duration equal to the duration T of chirp B.

The triggering of timer 30 by pulse A then drives switch 22 to connect mixer 23 to the input terminal B. The mixer receives, as described hereabove, the transmission chirp B.

At the end of time T, the timer 30 actuates the commutation and the mixer 23 is then connected to oscillator 29. It is easy to ascertain by calculation that the useful chirp $C_u$ is still obtained at the output of mixer 28. The signal transmitted by oscillator 29 is used therefore as a relay for the transmission chirp B which has ceased at the end of time T.

It could be contemplated to choose $F'_1 = 0$. In such a case, the mixer 23, the oscillator 24 and the filter 25 would be omitted and the band stop filter 27 would be replaced by a high pass filter stopping the zero frequency. Such an alternative is also within the scope of the invention.

However, it should be noted that in this case the frequency $F_o$ of the relay signal will have to be chosen at least equal to the maximum frequency $F_2$ reached by the transmission chirp so that the operation with the relay signal is the same as that with chirp B.

In the case where, on the contrary, $F'_1$ is high, the value of the frequency $F_o$ may be chosen quite freely.

The mixer 34, associated with the low pass filter 35, delivers a signal the frequency of which is the difference between the frequencies F and $F_b$ of the input signals, that is $$F_l - F_b = F_1 + k \cdot t - k \cdot t_o$$

that is the frequency $F_R$ of the useful chirp $C_u$.

The device 15 supplies therefore at its output D connected with the delay line 16 a signal free from the interference chirp $C_p$.

What is claimed is:

1. An optical pulse compression radar device, comprising a circuit for generating electrical signals of determined duration and with a frequency variable as a function of time, called chirps, an optical transmitter comprising a continuous transmission source modulated by the chirps, a receiver for deriving chirps from the light signals received and a processing circuit for the chirps supplied by the receiver, first mixer means having a first input connected to said receiver and a second input operable to be connected to said chirp generation circuit, said first mixer means delivering a signal of a frequency equal to the difference of the frequencies of the signals applied to its inputs, a filter connected to the output of said first mixer means, second mixer means having a first input connected to said filter and a second input operable to be connected to said chirp generation circuit, the output signal of said second mixer means having a frequency equal to the difference of the frequencies of the signals applied at its inputs, said output signal being fed to said processing circuit, an oscillator, switch means for connecting said second inputs of said first and second mixer means either to said chirp generation circuit or to said oscillator, and timer means for controlling said switch means thereby to connect said mixer means to said chirp generation circuit during the generation of a chirp by said circuit.

2. The device according to claim 1, including an oscillator for generating a signal of frequency $F'_1$, third mixer means having a first input connected to said oscillator and a second input operable to be connected to said chirp generation circuit and delivering a signal of a frequency equal to the sum of the frequencies of the signals applied at its inputs, said signal being fed to both said second inputs of said first and said second mixer means, said filter being a band stop filter stopping frequency $F'_1$.

3. The device according to claim 2, including an oscillator, switch means for connecting said second input of said third mixer means either to said chirp generation circuit or to said oscillator, and timer means for controlling said switch means thereby to connect said third mixer means to said chirp generation circuit during the generation of a chirp by said circuit.

* * * * *